US008843880B2

(12) United States Patent  
Carey et al.

(10) Patent No.: US 8,843,880 B2  
(45) Date of Patent: Sep. 23, 2014

(54) SOFTWARE DEVELOPMENT FOR A HYBRID COMPUTING ENVIRONMENT

(75) Inventors: James E. Carey, Rochester, MN (US); Matthew W. Markland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 12/360,158

(22) Filed: Jan. 27, 2009

(65) Prior Publication Data

US 2010/0192123 A1 Jul. 29, 2010

(51) Int. Cl.  
*G06F 9/44* (2006.01)

(52) U.S. Cl.  
CPC ........................... *G06F 8/30* (2013.01)  
USPC ........................... 717/106; 711/170

(58) Field of Classification Search  
CPC ............................................. G06F 8/30  
USPC .............................................. 717/106  
See application file for complete search history.

(56) References Cited

U.S. PATENT DOCUMENTS

| | | |
|---|---|---|
| 4,989,131 A | 1/1991 | Stone |
| 5,073,851 A | 12/1991 | Masterson et al. |
| 5,363,484 A | 11/1994 | Desnoyers et al. |
| 5,467,459 A | 11/1995 | Alexander et al. |
| 5,548,761 A * | 8/1996 | Balasundaram et al. ...... 717/159 |
| 5,590,345 A | 12/1996 | Barker et al. |
| 5,613,146 A | 3/1997 | Gove et al. |
| 5,835,961 A | 11/1998 | Harvey et al. |
| 5,873,127 A | 2/1999 | Harvey et al. |
| 5,983,329 A | 11/1999 | Thaler et al. |
| 6,061,773 A | 5/2000 | Harvey et al. |
| 6,070,194 A | 5/2000 | Yu et al. |
| 6,125,430 A | 9/2000 | Noel et al. |
| 6,266,745 B1 | 7/2001 | De Backer et al. |
| 6,275,857 B1 | 8/2001 | McCartney |
| 6,308,255 B1 | 10/2001 | Gorishek et al. |
| 6,330,659 B1 | 12/2001 | Poff et al. |
| 6,377,979 B1 | 4/2002 | Yamashita et al. |

(Continued)

OTHER PUBLICATIONS

Buonadonna, et al., "Queue Pair IP: A Hybrid Architecture for System Area Networks", Proceedings of the 29th Annual International Symposium on Computer Architecture (ISCA'02), vol. 30, Issue 2, May 2002, pp. 247-256, ACM New York, NY, USA.*

(Continued)

*Primary Examiner* — Wei Zhen  
*Assistant Examiner* — Mohammed Huda  
(74) *Attorney, Agent, or Firm* — Biggers Kennedy Lenart Spraggins, LLP

(57) ABSTRACT

Software development for a hybrid computing environment that includes a host computer and an accelerator, the host computer and the accelerator adapted to one another for data communications by a system level message passing module and by two or more data communications fabrics of at least two different fabric types where software development includes creating, by a programmer, a computer program for execution in the hybrid computing environment, the computer program including directives for generation of computer program code that moves contents of memory among host computers and accelerators in the hybrid computing environment; generating, by a code generator application, source code in accordance with the directives; analyzing, by the code generator application, operation of the generated code for data movement and utilization of moved data; and regenerating, by the code generator application, the source code in accordance with the directives and further in accordance with results of the analysis.

18 Claims, 5 Drawing Sheets

(56) References Cited

U.S. PATENT DOCUMENTS

| | | | |
|---|---|---|---|
| 6,473,849 B1 | 10/2002 | Keller et al. |
| 6,553,411 B1 | 4/2003 | Dias et al. |
| 6,556,659 B1 | 4/2003 | Bowman-Amuah |
| 6,598,130 B2 | 7/2003 | Harris et al. |
| 6,651,132 B1 | 11/2003 | Trau |
| 6,658,522 B1 | 12/2003 | Martin et al. |
| 6,848,106 B1 | 1/2005 | Hipp |
| 6,918,070 B1 | 7/2005 | Sharma |
| 6,948,034 B2 | 9/2005 | Aoki |
| 7,383,330 B2 | 6/2008 | Moran et al. |
| 7,418,574 B2 | 8/2008 | Mathur et al. |
| 7,428,573 B2 | 9/2008 | McCanne et al. |
| 7,436,824 B2 | 10/2008 | Pepenella |
| 7,437,403 B2 | 10/2008 | Xue et al. |
| 7,469,273 B2 | 12/2008 | Anderson et al. |
| 7,478,154 B2 | 1/2009 | Cochran et al. |
| 7,631,023 B1 | 12/2009 | Kaiser et al. |
| 7,668,924 B1 | 2/2010 | Youn et al. |
| 7,725,905 B1 * | 5/2010 | Doshi et al. ............... 719/328 |
| 7,752,417 B2 | 7/2010 | Manczak et al. |
| 7,814,295 B2 | 10/2010 | Inglett et al. |
| 7,904,929 B1 | 3/2011 | Jaunin et al. |
| 7,984,267 B2 | 7/2011 | Aho et al. |
| 7,991,803 B2 | 8/2011 | Mercer et al. |
| 8,001,206 B2 | 8/2011 | Archer et al. |
| 8,037,217 B2 | 10/2011 | Arroyo et al. |
| 8,132,106 B2 | 3/2012 | Low et al. |
| 2002/0029289 A1 | 3/2002 | Byrne |
| 2002/0056033 A1 | 5/2002 | Huppenthal |
| 2002/0108059 A1 * | 8/2002 | Canion et al. ............... 713/201 |
| 2002/0112091 A1 | 8/2002 | Schott et al. |
| 2002/0184217 A1 | 12/2002 | Bisbee et al. |
| 2003/0028751 A1 | 2/2003 | McDonald et al. |
| 2003/0061432 A1 | 3/2003 | Huppenthal et al. |
| 2003/0120723 A1 | 6/2003 | Bright et al. |
| 2003/0226018 A1 | 12/2003 | Tardo et al. |
| 2004/0221127 A1 | 11/2004 | Ang |
| 2005/0273571 A1 | 12/2005 | Lyon et al. |
| 2005/0278409 A1 | 12/2005 | Kutzik et al. |
| 2005/0278680 A1 * | 12/2005 | Mukherjee et al. ............ 716/16 |
| 2006/0018341 A1 | 1/2006 | Pettery et al. |
| 2006/0085789 A1 | 4/2006 | Laborczfalvi et al. |
| 2006/0168435 A1 | 7/2006 | Svensson et al. |
| 2006/0224830 A1 | 10/2006 | Davis et al. |
| 2007/0112999 A1 | 5/2007 | Oney et al. |
| 2007/0113227 A1 | 5/2007 | Oney et al. |
| 2007/0226807 A1 * | 9/2007 | Ginter et al. ............... 726/27 |
| 2007/0255802 A1 | 11/2007 | Aloni et al. |
| 2007/0294505 A1 | 12/2007 | Traut et al. |
| 2008/0028103 A1 | 1/2008 | Schlansker et al. |
| 2008/0091855 A1 | 4/2008 | Moertl et al. |
| 2008/0114937 A1 | 5/2008 | Reid et al. |
| 2008/0183882 A1 | 7/2008 | Flynn et al. |
| 2008/0222396 A1 | 9/2008 | Spracklen et al. |
| 2008/0256330 A1 | 10/2008 | Wang et al. |
| 2008/0259086 A1 | 10/2008 | Doi et al. |
| 2008/0288747 A1 | 11/2008 | Inglett et al. |
| 2009/0024734 A1 | 1/2009 | Merbach et al. |
| 2009/0080428 A1 | 3/2009 | Witkowski et al. |
| 2009/0110326 A1 | 4/2009 | Kim et al. |
| 2009/0182976 A1 | 7/2009 | Agesen |
| 2009/0276601 A1 | 11/2009 | Kancheria |
| 2010/0036940 A1 | 2/2010 | Carey et al. |
| 2010/0058031 A1 | 3/2010 | Aho et al. |
| 2010/0058356 A1 | 3/2010 | Aho et al. |
| 2010/0064295 A1 | 3/2010 | Aho et al. |
| 2010/0107243 A1 | 4/2010 | Moyer et al. |
| 2010/0153541 A1 | 6/2010 | Arimilli et al. |
| 2010/0191711 A1 | 7/2010 | Carey et al. |
| 2010/0191822 A1 | 7/2010 | Archer et al. |
| 2010/0191823 A1 | 7/2010 | Archer et al. |
| 2010/0191909 A1 | 7/2010 | Archer et al. |
| 2010/0191917 A1 | 7/2010 | Archer et al. |
| 2010/0191923 A1 | 7/2010 | Archer et al. |
| 2010/0192123 A1 | 7/2010 | Carey et al. |
| 2010/0198997 A1 | 8/2010 | Archer et al. |
| 2010/0250877 A1 | 9/2010 | Gaither et al. |
| 2010/0274868 A1 | 10/2010 | Arroyo et al. |
| 2011/0035556 A1 | 2/2011 | Aho et al. |
| 2011/0191785 A1 | 8/2011 | Archer et al. |
| 2011/0225226 A1 | 9/2011 | Archer et al. |
| 2011/0225255 A1 | 9/2011 | Archer et al. |
| 2011/0225297 A1 | 9/2011 | Archer et al. |
| 2011/0238949 A1 | 9/2011 | Archer et al. |
| 2011/0239003 A1 | 9/2011 | Archer et al. |
| 2011/0267197 A1 | 11/2011 | Archer et al. |
| 2011/0271059 A1 | 11/2011 | Aho et al. |
| 2011/0271263 A1 | 11/2011 | Archer et al. |
| 2012/0191920 A1 | 7/2012 | Aho et al. |
| 2012/0192204 A1 | 7/2012 | Aho et al. |
| 2013/0060844 A1 | 3/2013 | Archer et al. |
| 2013/0179901 A1 | 7/2013 | Aho et al. |
| 2013/0238860 A1 | 9/2013 | Archer et al. |

OTHER PUBLICATIONS

Brightwell, et al., "A Preliminary Analysis of the Infinipath and XD1 Network Interfaces", Proceedings of the 20th International Conference on Parallel and Distributed Processing (IPDPS'06), Jun. 2006, 18 pages, IEEE Computer Society Washington, DC, USA.*
Office Action, U.S. Appl. No. 12/189,342, Jul. 26, 2011.
Office Action, U.S. Appl. No. 12/204,391, Aug. 17, 2011.
Office Action, U.S. Appl. No. 12/358,663, Oct. 5, 2011.
Office Action, U.S. Appl. No. 12/359,383, Aug. 5, 2011.
Office Action, U.S. Appl. No. 12/361,943, Sep. 21, 2011.
Office Action, U.S. Appl. No. 12/428,646, Feb. 7, 2011.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/.
Ball, Stuard, Introduction to direct memory access, www.eetimes.com [online], Oct. 14, 2003 [accessed online on Nov. 12, 2010], URL: http://www.eetimes.com/discussion/other/4024879/introduction-to-direct-memory-access.
Office Action, U.S. Appl. No. 12/204,352, Dec. 16, 2010.
Final Office Action, U.S. Appl. No. 12/189,342, Dec. 23, 2010.
Office Action, U.S. Appl. No. 12/362,137, Nov. 22, 2010.
Office Action, U.S. Appl. No. 12/364,590, Nov. 26, 2010.
Office Action, U.S. Appl. No. 12/361,910, Nov. 19, 2010.
Notice of Allowance, U.S. Appl. No. 12/204,352, Mar. 14, 2011.
Final Office Action, U.S. Appl. No. 12/362,137, Apr. 25, 2011.
Notice of Allowance, U.S. Appl. No. 12/364,590, Apr. 29, 2011.
Notice of Allowance, U.S. Appl. No. 12/361,910, Apr. 5, 2011.
U.S. Appl. No. 12/204,842, filed Sep. 2008, Aho et al.
U.S. Appl. No. 12/204,352, filed Sep. 2008, Aho et al.
U.S. Appl. No. 12/204,391, filed Sep. 2008, Aho et al.
U.S. Appl. No. 12/189,342, filed Aug. 2008, Carey et al.
U.S. Appl. No. 12/358,663, filed Jan. 2009, Archer et al.
U.S. Appl. No. 12/699,162, filed Feb. 2010, Archer et al.
U.S. Appl. No. 12/362,137, filed Jan. 2009, Archer et al.
U.S. Appl. No. 12/359,383, filed Jan. 2009, Archer et al.
U.S. Appl. No. 12/361,943, filed Jan. 2009, Archer et al.
U.S. Appl. No. 12/360,930, filed Jan. 2009, Carey et al.
U.S. Appl. No. 12/364,590, filed Feb. 2009, Archer et al.
U.S. Appl. No. 12/360,158, filed Jan. 2009, Carey et al.
U.S. Appl. No. 12/537,377, filed Aug. 2009, Aho et al.
U.S. Appl. No. 12/361,910, filed Jan. 2009, Archer et al.
U.S. Appl. No. 12/428,646, filed Apr. 2009, Arroyo et al.
U.S. Appl. No. 12/771,627, filed Apr. 2010, Aho et al.
Notice of Allowance, U.S. Appl. No. 12/204,842, Mar. 19, 2012.
Final Office Action, U.S. Appl. No. 12/358,663, Mar. 21, 2012.
Final Office Action, U.S. Appl. No. 12/359,383, Jan. 27, 2012.
Final Office Action, U.S. Appl. No. 12/361,943, Jan. 31, 2012.
Office Action, U.S. Appl. No. 12/360,158, Jan. 19, 2012.
Notice of Allowance, U.S. Appl. No. 12/248,646, Jun. 9, 2011.

(56) References Cited

OTHER PUBLICATIONS

Office Action, U.S. Appl. No. 12/699,162, Apr. 27, 2012.
Final Office Action, U.S. Appl. No. 12/699,162, Aug. 8, 2012.
Office Action, U.S. Appl. No. 12/360,158, Aug. 6, 2012.
Office Action, U.S. Appl. No. 13/416,636, Sep. 7, 2012.
Office Action, U.S. Appl. No. 13/439,479, Nov. 2, 2012.
Notice of Allowance, U.S. Appl. No. 12/204,391, Dec. 7, 2011.
Advisory Action, U.S. Appl. No. 12/358,663, Jun. 18, 2012.
Notice of Allowance, U.S. Appl. No. 12/537,377, Jan. 13, 2012.
Notice of Allowance, U.S. Appl. No. 12/428,646, Jun. 9, 2011.
Office Action, U.S. Appl. No. 12/771,627, Jul. 9, 2012.
Martellaro, "Using the cell processor as an offload streaming assist for sessionization of network traffic for cross packet inspector", Aug. 2008, pp. 21-24.
Notice of Allowance, U.S. Appl. No. 12/358,663, Jan. 14, 2013.
RCE filed, U.S. Appl. No. 12/358,663, Mar. 21, 2013.
Office Action, U.S. Appl. No. 12/748,559, Feb. 21, 2013.
Office Action, U.S. Appl. No. 13/664,557, Feb. 1, 2013.
Buonadonna, Phillip, Culler, David, "Queue Pair IP: A Hybrid Architecture for System Area Networks", Aug. 7, 2002. Computer Architecture. 2002. Proceedings. 29th Annual Symposium. pp. 247-256.
Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, p. 8.
Office Action, U.S. Appl. No. 12/189,342, Aug. 11, 2008.

\* cited by examiner

SOFTWARE DEVELOPMENT FOR A HYBRID COMPUTING ENVIRONMENT

BACKGROUND OF THE INVENTION

1. Field of the Invention

The field of the invention is data processing, or, more specifically, methods, apparatus, and products for software development for a hybrid computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery and software development.

SUMMARY OF THE INVENTION

Methods, apparatus, and products for software development for a hybrid computing environment that includes a host computer having a host computer architecture and an accelerator having an accelerator architecture, the accelerator architecture optimized, with respect to the host computer architecture, for speed of execution of a particular class of computing functions, the host computer and the accelerator adapted to one another for data communications by a system level message passing module and by two or more data communications fabrics of at least two different fabric types. Software development according to embodiments of the present invention includes creating, by a programmer, a computer program for execution in the hybrid computing environment, the computer program including, along with computer program instructions, directives for generation of computer program code that moves contents of memory, across at least one of the data communications fabrics, among host computers and accelerators in the hybrid computing environment; generating, by a code generator application, source code in accordance with the directives; analyzing, by the code generator application, operation of the generated code for data movement and utilization of moved data; and regenerating, by the code generator application, the source code in accordance with the directives and further in accordance with results of the analysis.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
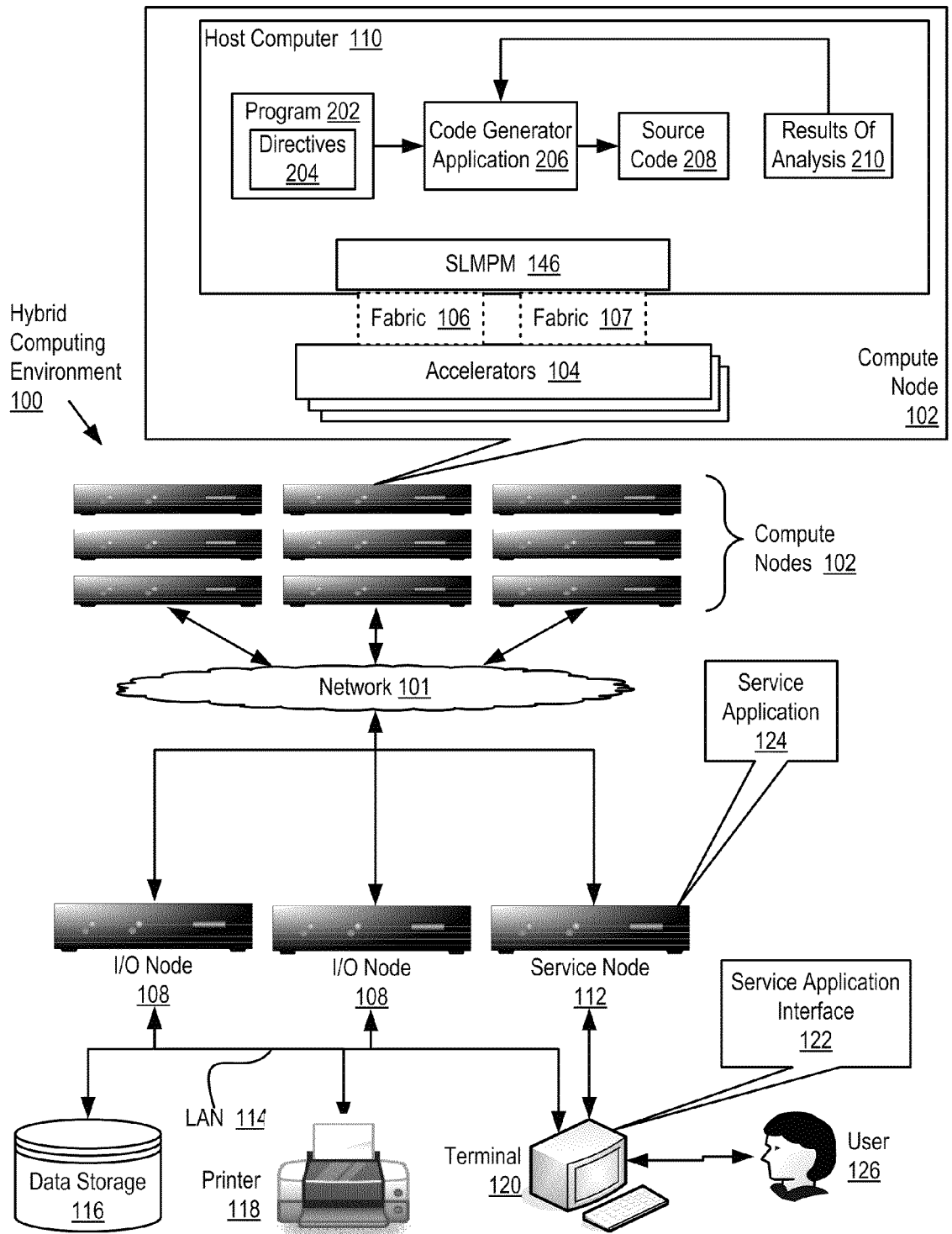
FIG. 1 sets forth a diagram of an example hybrid computing environment useful for software development according to embodiments of the present invention.

Exemplary methods, apparatus, and products for software development for a hybrid computing environment according to embodiments of the present invention are described with reference to the accompanying drawings, beginning with FIG. 1. FIG. 1 sets forth a diagram of an example hybrid computing environment (100) useful for software development according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol ('IP'), PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

- the Message Passing Interface or 'MPI,' an industry standard interface in two versions, first presented at Supercomputing 1994, not sanctioned by any major standards body,
- the Data Communication and Synchronization interface ('DACS') of the LANL supercomputer,
- the POSIX Threads library ('Pthreads'), an IEEE standard for distributed, multithreaded processing,
- the Open Multi-Processing interface ('OpenMP'), an industry-sanctioned specification for parallel programming, and
- other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

Software development for the example hybrid computing environment (100) of FIG. 1 according to embodiments of the present invention may include creating, by a programmer, such as the user (126) in the example of FIG. 1, a computer program (202) for execution in the hybrid computing environment (100). The example computer program (202) in the hybrid computing environment (100) of FIG. 1 includes, along with computer program instructions, directives (204) for generation of computer program code that moves contents of memory, across at least one of the data communications fabrics (106, 107), among hosts (110) and accelerators (104) in the hybrid computing environment (100). Software development for the hybrid computing environment (100) according to embodiments of the present invention may also include generating, by a code generator application (206), source code (208) in accordance with the directives (204); analyzing, by the code generator application (206), operation of the generated code (208) for data movement and utilization of moved data; and regenerating, by the code generator application (206), the source code (208) in accordance with the directives (204) and further in accordance with results (210) of the analysis.

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments useful for software development according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
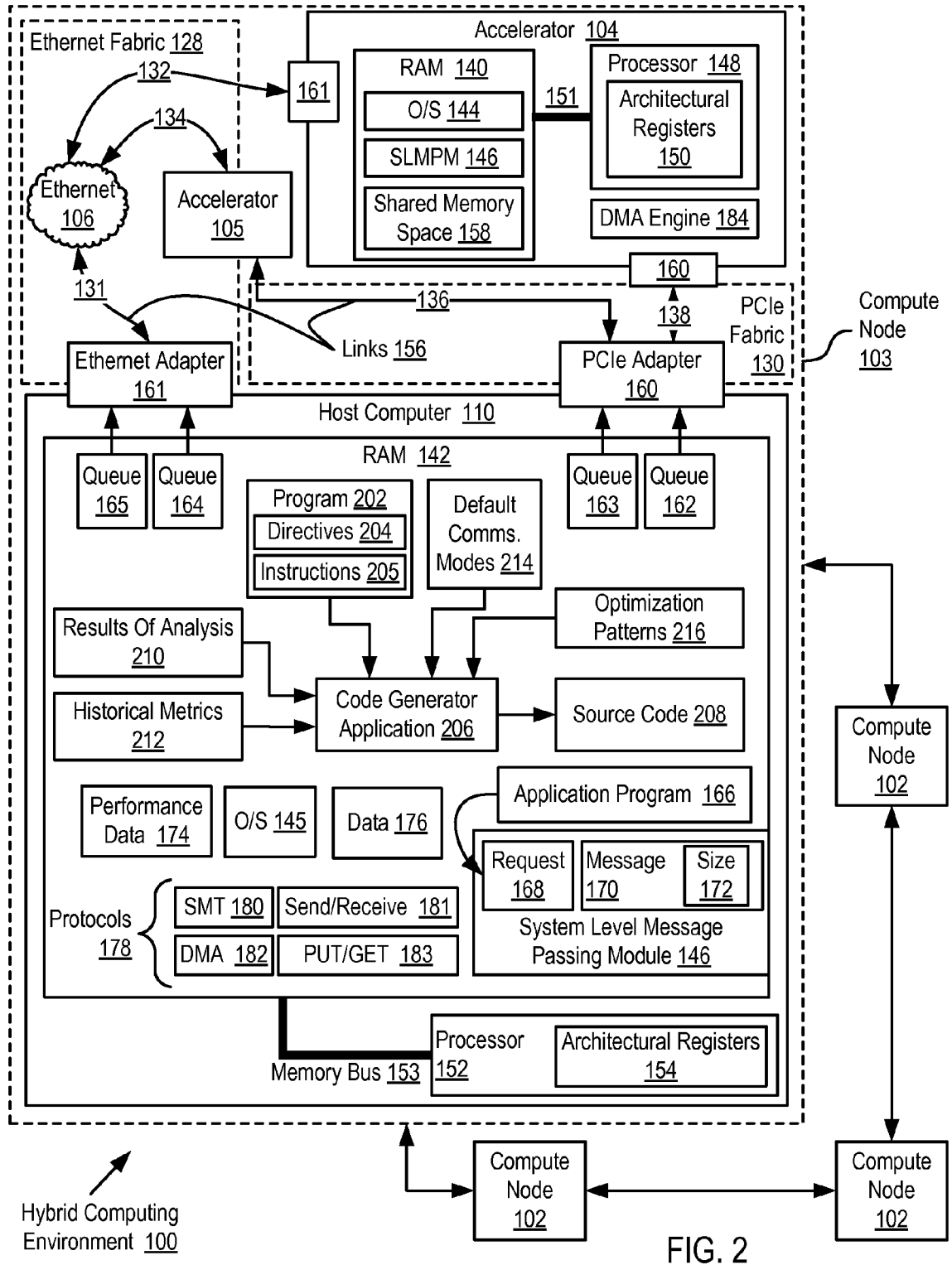
FIG. 2 sets forth a block diagram of an exemplary hybrid computing environment useful for software development according to embodiments of the present invention.

For further explanation, FIG. 2 sets forth a block diagram of an exemplary hybrid computing environment (100) useful for software development according to embodiments of the present invention. The hybrid computing environment (100) of FIG. 2 includes four compute nodes. Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (144, 145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2 may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMT protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a memory location on an origin device to a memory location on a target device through a DMA engine. A direct 'PUT' operation allows data to be transmitted and stored on the target device with little involvement from the target device's processor. To effect minimal involvement from the target device's processor in the direct 'PUT' operation, the DMA engine transfers the data to be stored on the target device along with a specific identification of a storage location on the target device. The DMA engine knows the specific storage location on the target device because the specific storage location for storing the data on the target device has been previously provided by the target device.

A remote 'GET' operation, sometimes denominated an 'rGET,' is another mode of transmitting data from a memory location on an origin device to a memory location on a target device through a DMA engine. A remote 'GET' operation allows data to be transmitted and stored on the target device with little involvement from the origin device's processor. To effect minimal involvement from the origin device's processor in the remote 'GET' operation, the DMA engine stores the data in a storage location accessible one the target device, notifies the target device, directly or out-of-band through a shared memory transmission, of the storage location and the size of the data ready to be transmitted, and the target device retrieves the data from the storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded according to embodiments of the present invention to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments according to embodiments of the present invention, where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments according to embodiments of the present invention, where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The above explanation of data processing in the example hybrid computing environment (100) of FIG. 2, describes execution of an application program (166) in the hybrid computing environment (100), data communications among hosts (110) and accelerators (104, 105) in the hybrid computing environment (100), and other data processing tasks carried out in the hybrid computing environment for further clarity in understanding typical data processing techniques carried out in hybrid computing environments configured according to embodiments of the present invention. Software, such as the host application program (166), may be developed for the example hybrid computing environment (100) of FIG. 2 in accordance with embodiments of the present invention in such a way as to optimize data movement and utilization of moved data.

In the example hybrid computing environment (100) of FIG. 2, a programmer creates a computer program (202) for execution in the hybrid computing environment (100). Such a computer program (202) includes, along with computer program instructions (205), directives (204) for generation of computer program code that moves contents of memory, such as application data (176), across at least one of the data communications fabrics (130, 128), among host computers (110) and accelerators (104) in the hybrid computing environment. A programmer as the term is used in this specification may refer to any of: a human user that directs computer hardware and software to create a computer program, the computer hardware and software itself, or some combination of the two.

A directive is a command or notification interleaved in computer program instructions of a computer program that informs source code generation by a code generator application with respect to data movement and data utilization in a hybrid computing environment. Such directives may include memory management directives, memory transfer directives, and memory assignment directives. Memory management directives may include a memory allocation directive and a memory identification directive. A memory assignment directive allocates memory whose contents are to be moved among host computers and accelerators and includes a name for the allocated memory, an address for the allocated memory, a size of the allocated memory, and a specification of the type of data to be stored in the allocated memory. Consider the following pseudo-code as an example of a memory assignment directive:

MemoryCreate <name> <address> <size> <type>

The above example memory assignment directive allocates memory whose contents are to be moved among host computers and accelerators, where the memory has a name for the allocated memory, <name>, an address for the allocated memory, <address>, a size of the allocated memory, <size>, and a specification of the type of data to be stored in the allocated memory <type>. The specification of the type of data to be stored may be useful in byte swapping to correct for differences in endianness among hosts and accelerators.

A memory identification directive identifies memory whose contents are to be moved among host computers and accelerators and includes a name of the identified memory, an address of the identified memory, a size of the identified memory, and a specification of the type of data to be stored in the identified memory. Consider the following pseudo-code as an example of a memory identification directive:

MemoryIdentify <name> <address> <size> <type>

The above example memory identification directive identifies memory whose contents are to be moved among host computers and accelerators and includes a name of the identified memory, <name>, an address of the identified memory, <address>, a size of the identified memory, <size>, and a specification of the type of data to be stored in the identified memory, <type>. Such memory may be previously allocated, or may be by the memory identification directive if not expressly, previously allocated.

Memory transfer directives may include a remote memory transfer directive and a local memory transfer directive. A remote memory transfer directive transfers the contents of local memory to remote memory and includes a name of a segment of local memory whose contents are to be transferred, a name of a segment of remote memory to which the contents are to be transferred, and a hint regarding a data communications mode for the transfer. Consider the following pseudo-code as an example of a remote memory transfer directive:

Memory Xfer <name> To <nameRemote> <hints>

The above example remote memory transfer directive transfers the contents of local memory to remote memory and includes a name of a segment of local memory whose contents are to be transferred, <name>, a name of a segment of remote memory to which the contents are to be transferred, <nameRemote>, and a hint regarding a data communications mode for the transfer, <hint>. A 'hint' as a parameter of a directive provides greater information to the code generator application with respect to a memory transfer so that the code generator application may generate more efficient code for the data transfer. A programmer may specify, for example, in a hint for a data transfer a preferred, non-default data communications mode, such as DMA over PCIe. The code generator application (206), when generating source code for the data transfer, may use such non-default data communications mode as a starting point for optimization. As another example, a programmer may also specify in a hint a preferred data communications message size, or a typical size of the data to be transferred, information which the code generator application (206) may use to select a non-default data communications mode and generate source code for the data transfer of greater efficiency.

A local memory transfer directive transfers the contents of remote memory to local memory and includes a name of a segment of remote memory whose contents are to be transferred, a name of a segment of local memory to which the contents are to be transferred, and a hint regarding a data communications mode for the transfer. Consider the following pseudo-code as an example of a local memory transfer directive:

Memory Xfer <nameRemote> From <name> <hints>

The above example local memory transfer directive transfers the contents of remote memory to local memory and includes a name of a segment of remote memory whose contents are to be transferred, <nameRemote>, a name of a segment of local memory to which the contents are to be transferred, <name>, and a hint regarding a data communications mode for the transfer <hint>.

Memory assignment directives may include an assignment directive; an assignment start directive; an assignment end directive; a use start directive; and a use end directive. An assignment directive includes a name of the segment of memory and a value to assign to the segment. Consider the following pseudo-code as an example of an assignment directive:

Memory Assign <name> <value>

The above example assignment directive assigns a value to a segment of memory and includes a name of the segment of memory, <name>, and a value to assign to the segment <value>.

An assignment start directive identifies the starting point of the computer program that carries out the assignment of the value to the segment and includes a name of the memory segment. Consider the following pseudo-code as an example of an assignment start directive:

Memory AssignStart <name>

The above example assignment start directive assigns identifies the starting point of the computer program that carries out the assignment of the value to the segment and includes a name of the memory segment and includes a name of the segment of memory, <name>.

An assignment end directive identifies the end of the computer program that carries out the assignment of the value to the segment and includes a name of the memory segment. Consider the following pseudo-code as an example of an assignment end directive:

Memory AssignEnd <name>

The above example assignment end directive assigns identifies the end of the computer program that carries out the assignment of the value to the segment and includes a name of the memory segment and includes a name of the segment of memory, <name>.

A use start directive identifies the start of the computer program that uses the segment and includes a name of the memory segment. Consider the following pseudo-code as an example of a use start directive:

Memory UseStart <name>

The above example use start directive identifies the start of the computer program that uses the segment and includes a name of the memory segment, <name>.

A use end directive identifies the end of the computer program that uses the segment and includes a name of the memory segment. Consider the following pseudo-code as an example of a use end directive:

Memory UseEnd <name>

The above example use end directive identifies the end of the computer program that uses the segment and includes a name of the memory segment, <name>. The above pseudo-code examples of directives are for clarity of explanation only, not limitation. Readers of skill in the art will recognize that other types of memory directives identifying other parameters may be useful in developing software in a hybrid computing environment (100) in accordance with embodiments of the present invention.

The code generator application (206), in the example hybrid computing environment (100) of FIG. 2, is a module of computer program instructions that operates generally for software development in the hybrid computing environment by generating source code (208) in accordance with the directives (204) of the computer program (202); analyzing operation of the generated code (208) for data movement and utilization of moved data; and regenerating the source code (208) in accordance with the directives (204) and further in accordance with results (210) of the analysis.

The code generator application (206) may generate source code (208) in accordance with the directives (204) of the computer program (202) by generating SLMPM (146) library function calls that effect data transfers across default data communications modes (214) for those transfers identified in the computer program by directives without hint parameters specifying non-default modes, generating SLMPM (146) library function calls that effect data transfers across non-default data communications modes (214) for those transfers identified in the computer program by directives including hint parameters that specify non-default modes, generating SLMPM (146) library function calls to create memory segments and to allocate memory segments, and so on as will occur to readers of skill in the art. The code generator application (206) may, for example, generate SLMPM (146) library function calls that effect data transfers by shared memory transfers (180), a default data communications protocol (178), for all data transfers identified by the memory transfer directives without hint parameters to the contrary.

Generating such source code (208) by the code generator application (206) may also include generating the source code in dependence upon the types of data communications fabric that adapt the host computers and the accelerators or generating the source code in dependence upon other hardware configuration parameters of the hybrid computing environment. Such hardware configuration parameters may include, for example, total available memory (142, 140) in the hybrid computing environment (100), size of available memory local to a host computer (110), size of available memory local to an accelerator (104, 105), and so on. That is, the code generator application (206) may select data communications mode for data transfers identified by the directives (204) in the computer program (202) in dependence upon a particular hardware configuration of the hybrid computing environment (100) in which the computer program is to be executed.

The code generator application (206) may also generate source code in accordance with the directives (204) and further in accordance with one or more optimization patterns (216). That is, instead of selecting a default data communications mode for all data transfers, the code generator application (206) may select another data communications mode in dependence upon the pattern of directives in the code, parameters of the directives, and so on. Optimization patterns (216) are predefined rules that govern code generation, in dependence upon one or more parameters of one or more directives of a computer program and in dependence upon predefined patterns of directives of the computer program. Examples of optimization patterns (216) include combining memory allocation directives positioned together in the computer program; selecting data communications modes for a particular computer program in dependence upon sizes of memory segments in the computer program; generating code that interleaves data transfers of a portion of a memory segment and an assignment of a value to the entire memory segment, when the segment is greater than a predefined size; and other rules as will occur to readers of skill in the art.

In generating the source code (208), the code generator application (206) may also insert one or more tracepoints for gathering operational metrics of execution of the source code, specifically data movement and data utility metrics. A tracepoint is a special type of breakpoint in computer program code that performs an action when encountered in execution of the computer program code, typically an action to gather metrics such as starting a timer, stopping a timer, storing the value of a timer, and so on. In hybrid computing environments (100) configured for software development according to embodiments of the present invention, tracepoints are inserted to gather operational metrics of execution of the program code. Operational metrics are metrics describing operation of the hybrid computing environment, specifically metrics describing data movement in the computer program and data utilization. Examples of such operational metrics may include a time required for each data movement executed in the code, an average time required to move data according to each particular data communications mode during execution of the code, a time of each particular data processing task executed in the code, time spent waiting for each allocation, creation, or assignment of memory, and others as may occur to readers of skill in the art.

The code generator application (214) may then analyze operation of the generated code (208) for data movement and utilization of moved data by executing the code in the hybrid computing environment and gathering operational metrics at the tracepoints in the code. Data movement as the term is used in this specification refers to data communications carried out between host computers and accelerators, from one location in memory to another. Data utilization as the term is used in this specification refers to use of data by the computer program in relation to creation and allocation of computer memory, that is, the time required for data processing tasks to wait for memory-related tasks to be carried out.

The code generator application (214), after analyzing the operation of the generated code, may then regenerate the source code (208) in accordance with the directives (204) and further in accordance with the results (210) of the analysis. The code generator application (206) may regenerate the source code (208) in accordance with the directives (204) and further in accordance with the results (210) of the analysis by altering the previously generated source code (208) to improve results of execution of the source code in dependence upon historical data communications and memory utilization metrics (212). That is, the code generator application may compare operational metrics gathered during execution of source code (208) to historical data communications and memory utilization metrics (212) to identify portions of the source code to alter. Such historical metrics (212) may be created by recording, over time, performance data (127) of data communications modes produced in executing various host application programs (166). The code generator application (214) may alter the code by: selecting different data communications modes for moving data among host computers and accelerators—different fabrics, protocols, links and the like—altering message size of data communications; combining, splitting, or rearranging code that effects memory creation and allocation; moving code that assigns values to memory; and so on.

In some hybrid computing environments configured for software development according to embodiments of the present invention the code generator application (206), after analyzing operation of the generated code, may provide the results of the analysis to the programmer, and prior to regenerating the source code, the programmer may alter the directives (204) in the computer program to optimize the movement of data and the utilization of the moved data. The code generator application (206) may provide the results (210) to a programmer through a Graphical User Interface ('GUI') of a service application (124 on FIG. 1) executing on a service node (112 on FIG. 1) connected to a terminal (120 on FIG. 1) running a service application interface (122 on FIG. 1). The programmer may alter the directives in code in various ways, such as for example, rearranging, splitting, or combining directives, specifying hints that identify to the code generator a particular data communications mode for particular data transfers in the code, explicitly specifying in a hint a size of data communications messages for data transfers, and so on as will occur to readers of skill in the art.

The code generator application (206) in the examples of FIG. 1 and FIG. 2 is executed by the host computer (110). Readers of skill in the art will recognize, however, that such a code generator application (206) may execute on another computer such as a service node (112 on FIG. 1) or other computer remotely connected for data communications to the host computer (110). In analyzing the generated source code (208) the code generator typically does, in fact, execute the source code in the hybrid computing environment, on a host computer and accelerators, but the code generator application (206) itself, along with any software application used by the programmer to create the computer program, need not be executed in the hybrid computing environment (100), but may execute on a computer outside of and connected for data communications to the hybrid computing environment (100).

Figure 3:
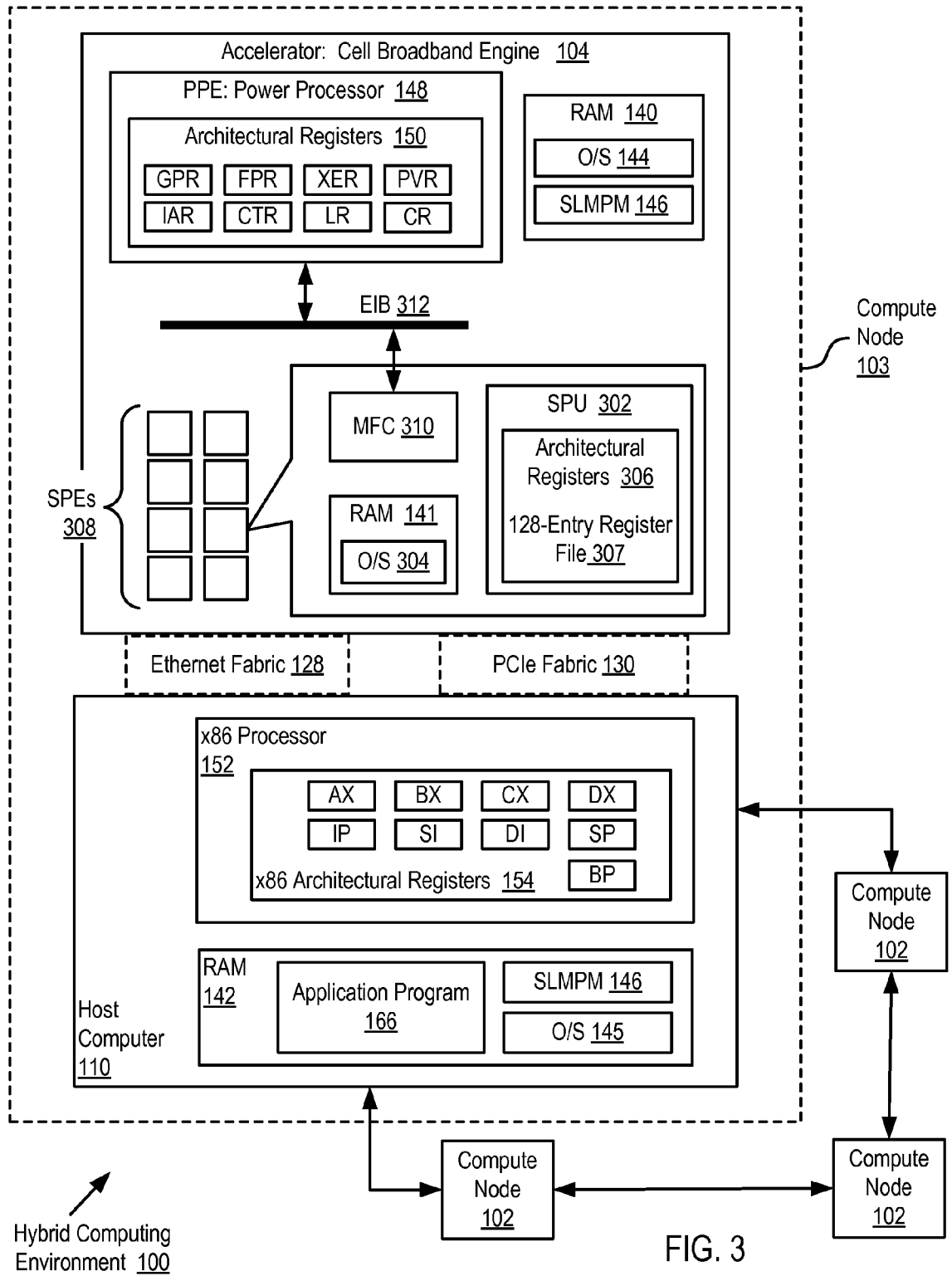
FIG. 3 sets forth a block diagram of a further exemplary hybrid computing environment useful for software development according to embodiments of the present invention.

For further explanation, FIG. 3 sets forth a block diagram of a further exemplary hybrid computing environment (100) useful for software development according to embodiments of the present invention. The hybrid computing environment of FIG. 3 is similar to the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations ('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) according to embodiments of the present invention by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

Software development for the hybrid computing environment (100) in the example of FIG. 3 may be carried out according to embodiments of the present invention by creating, by a programmer, a computer program for execution in the hybrid computing environment, the computer program including, along with computer program instructions, directives for generation of computer program code that moves contents of memory, across at least one of the data communications fabrics, among host computers (110) and accelerators (104) in the hybrid computing environment (100); generating, by a code generator application, source code in accordance with the directives; analyzing, by the code generator application, operation of the generated code for data movement and utilization of moved data; and regenerating, by the code generator application, the source code in accordance with the directives and further in accordance with results of the analysis.

Figure 4:
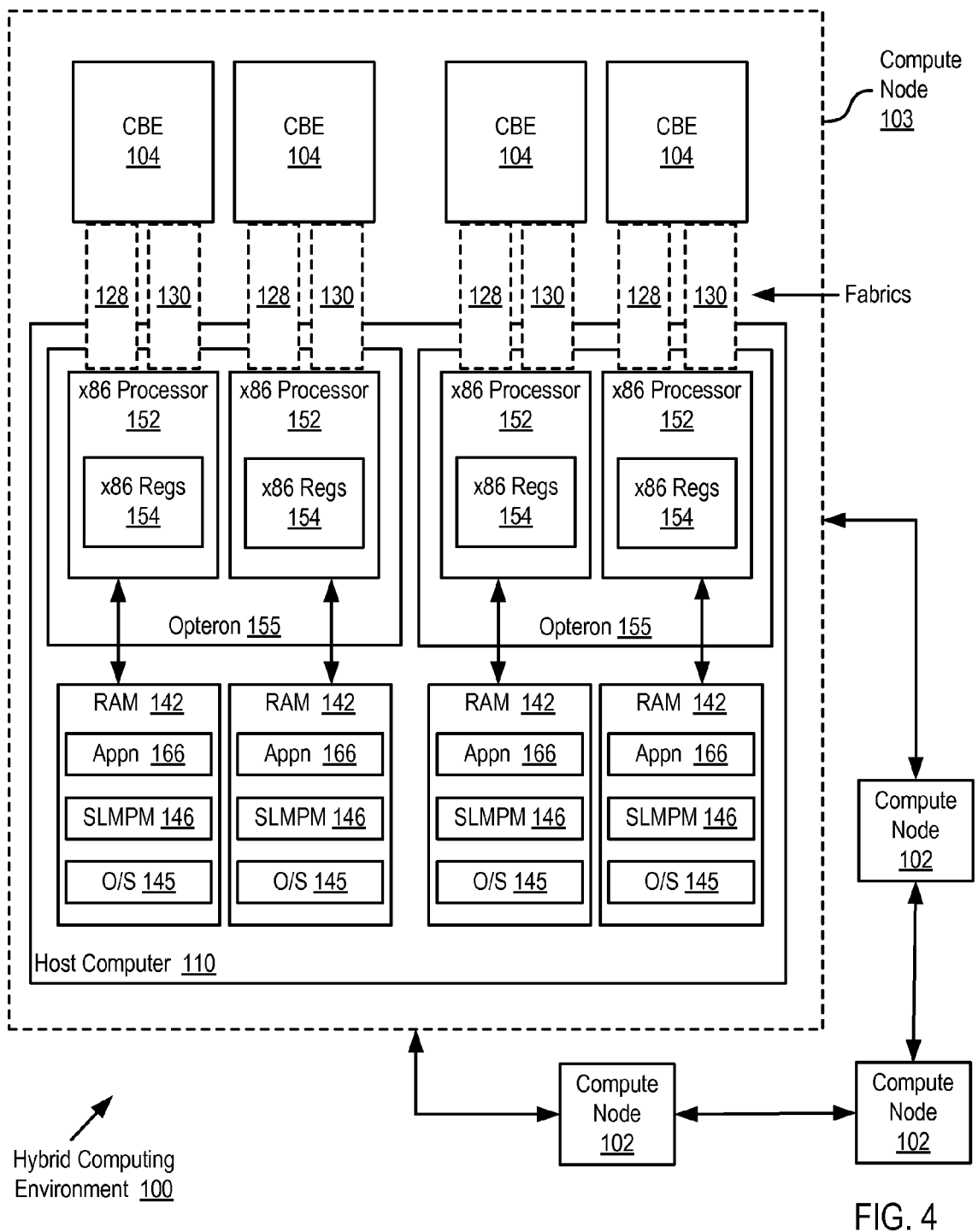
FIG. 4 sets forth a block diagram of a further exemplary hybrid computing environment useful for software development according to embodiments of the present invention.

For further explanation, FIG. 4 sets forth a block diagram of a further exemplary hybrid computing environment (100) useful for software development according to embodiments of the present invention. The hybrid computing environment of FIG. 4 is similar to the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) according to embodiments of the present invention by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

Software development for the hybrid computing environment (100) in the example of FIG. 4 may be carried out according to embodiments of the present invention by creating, by a programmer, a computer program for execution in the hybrid computing environment, the computer program including, along with computer program instructions, directives for generation of computer program code that moves contents of memory, across at least one of the data communications fabrics, among host computers (110) and accelerators (104) in the hybrid computing environment (100); generating, by a code generator application, source code in accordance with the directives; analyzing, by the code generator application, operation of the generated code for data movement and utilization of moved data; and regenerating, by the code generator application, the source code in accordance with the directives and further in accordance with results of the analysis.

Figure 5:
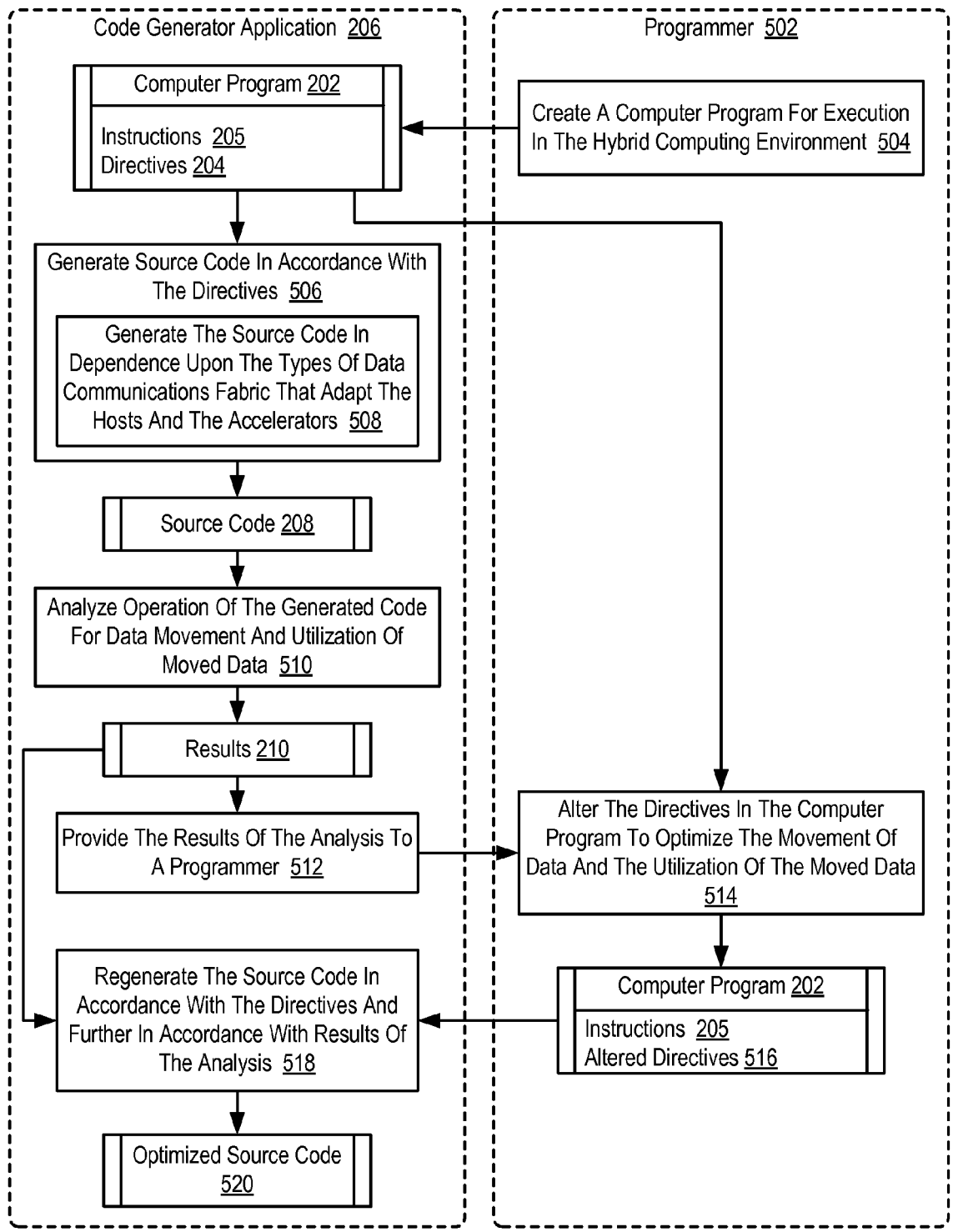
FIG. 5 sets forth a flow chart illustrating an exemplary method of software development for a hybrid computing environment according to embodiments of the present invention.

For further explanation, FIG. 5 sets forth a flow chart illustrating an exemplary method of software development for a hybrid computing environment according to embodiments of the present invention. In the method of FIG. 5 software is developed for a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by an SLMPM (146 on FIG. 2) and by two or more data communications fabrics (128, 130 on FIG. 2) of at least two different fabric types.

The method of FIG. 5 includes creating (504), by a programmer (502), a computer program (202) for execution in the hybrid computing environment. In the method of FIG. 5, the computer program (202) includes, along with computer program instructions (205), directives (204) for generation of computer program code (208) that moves contents of memory, across at least one of the data communications fabrics, among host computers and accelerators in the hybrid computing environment. The method of FIG. 5 also includes generating (506), by a code generator application (206), source code (208) in accordance with the directives (204). In the method of FIG. 5, generating (506) source code (208) in accordance with the directives (204) includes generating (508) the source code (208) in dependence upon the types of data communications fabric that adapt the host computers and the accelerators. The method of FIG. 5 also includes analyzing (510), by the code generator application (206), operation of the generated code (208) for data movement and utilization of moved data. The method of FIG. 5 also includes providing (512), by the code generator application (206), the results (210) of the analysis (510) to the programmer (502) and altering (514) by the programmer (502) the directives (516) in the computer program (202) to optimize the movement of data and the utilization of the moved data. The method of FIG. 5 also includes regenerating (518), by the code generator application (206), the source code (520) in accordance with the directives (516) and further in accordance with results (210) of the analysis (512).

Exemplary embodiments of the present invention are described largely in the context of software development for a fully functional hybrid computing environment. Readers of skill in the art will recognize, however, that method aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of software development for a hybrid computing environment, the hybrid computing environment comprising:
    a host computer having a host processor comprising a host computer architecture;
    an accelerator having an accelerator processor comprising an accelerator architecture, the accelerator architecture optimized, with respect to the host computer architecture, for speed of execution of a particular class of computing functions, the accelerator architecture comprising a different architecture than the host computer architecture such that computer program instructions compiled for native execution by the accelerator cannot, without a recompile, be executed by the host processor and computer program instructions compiled for execution on the host processor cannot, without a recompile, be executed by the accelerator processor;
    the host computer and the accelerator adapted to one another for data communications by a system level message passing module;
    the host computer and the accelerator adapted to one another for data communications by two or more data communications fabrics of at least two different fabric types;
    the method comprising:
        receiving from a programmer, a computer program for execution in the hybrid computing environment, the computer program including, along with computer program instructions, directives for generation of computer program code that moves contents of memory, across at least one of the data communications fabrics and between a host computer and an accelerator in the hybrid computing environment;
        generating, by a code generator application, source code in accordance with the directives;
        analyzing, by the code generator application, operation of the generated code for data movement and utilization of moved data by comparing operational metrics gathered during execution of the source code to historical data communication and memory utilization metrics to identify portions of the source code to alter during regeneration; and
        regenerating, by the code generator application, the identified portions of the source code in accordance with the directives and further in accordance with results of the analysis to improve results of execution of the source code in dependence upon the historical data communications and the memory utilization metrics.

2. The method of claim 1 further comprising:
    providing the results of the analysis to the programmer.

3. The method of claim 1 wherein generating source code in accordance with the directives further comprises generating the source code in dependence upon the types of data communications fabric that adapt the host computers and the accelerators.

4. The method of claim 1 wherein the directives comprise memory management directives, including:
    a memory allocation directive that allocates memory whose contents are to be moved among host computers and accelerators, the memory allocation directive including a name for the allocated memory, an address for the allocated memory, a size of the allocated memory, and a specification of the type of data to be stored in the allocated memory; and
    a memory identification directive that identifies memory whose contents are to be moved among host computers and accelerators, the memory identification directive including a name of the identified memory, an address of the identified memory, a size of the identified memory, and a specification of the type of data to be stored in the identified memory.

5. The method of claim 1 wherein the directives comprise memory transfer directives, including:
    a remote memory transfer directive that transfers the contents of local memory to remote memory, the remote memory transfer directive including a name of a segment of local memory whose contents are to be transferred, a name of a segment of remote memory to which the contents are to be transferred, and a hint regarding a data communications mode for the transfer; and
    a local memory transfer directive that transfers the contents of remote memory to local memory, the local memory transfer directive including a name of a segment of remote memory whose contents are to be transferred, a name of a segment of local memory to which the contents are to be transferred, and a hint regarding a data communications mode for the transfer.

6. The method of claim 1 wherein the directives comprise memory assignment directives and use directives, the memory assignment directives including:

an assignment directive that assigns a value to a segment of memory, the assignment directive including a name of the segment of memory and a value to assign to the segment;

an assignment start directive that identifies the starting point of the computer program that carries out the assignment of the value to the segment;

an assignment end directive that identifies the end of the computer program that carries out the assignment of the value to the segment;

the use directives including:

a use start directive that identifies the start of the computer program that uses the segment; and a use end directive that identifies the end of the computer program that uses the segment.

7. A hybrid computing environment for software development, the hybrid computing environment comprising a host computer having a host processor comprising a host computer architecture, an accelerator having an accelerator processor comprising an accelerator architecture, the accelerator architecture optimized, with respect to the host computer architecture, for speed of execution of a particular class of computing functions, the accelerator architecture comprising a different architecture than the host computer architecture such that computer program instructions compiled for native execution by the accelerator cannot, without a recompile, be executed by the host processor and computer program instructions compiled for execution on the host processor cannot, without a recompile, be executed by the accelerator processor, the host computer and the accelerator adapted to one another for data communications by a system level message passing module, the host computer and the accelerator adapted to one another for data communications by two or more data communications fabrics of at least two different fabric types, the hybrid computing environment further comprising a computer processor, a computer memory operatively coupled to the computer processor, the computer memory having disposed within it computer program instructions that when executed by the computer processor cause the hybrid computing environment to carry out the steps of:

receiving from a programmer, a computer program for execution in the hybrid computing environment, the computer program including, along with computer program instructions, directives for generation of computer program code that moves contents of memory, across at least one of the data communications fabrics and between a host computer and an accelerator in the hybrid computing environment;

generating, by a code generator application, source code in accordance with the directives;

analyzing, by the code generator application, operation of the generated code for data movement and utilization of moved data by comparing operational metrics gathered during execution of the source code to historical data communication and memory utilization metrics to identify portions of the source code to alter during regeneration; and regenerating, by the code generator application, the identified portions of the source code in accordance with the directives and further in accordance with results of the analysis to improve results of execution of the source code in dependence upon the historical data communications and the memory utilization metrics.

8. The hybrid computing environment of claim 7 further comprising computer program instructions that when executed by the computer processor cause the hybrid computing environment to carry out the steps of:

providing the results of the analysis to the programmer.

9. The hybrid computing environment of claim 7 wherein generating source code in accordance with the directives further comprises generating the source code in dependence upon the types of data communications fabric that adapt the host computers and the accelerators.

10. The hybrid computing environment of claim 7 wherein the directives comprise memory management directives, including:

a memory allocation directive that allocates memory whose contents are to be moved among host computers and accelerators, the memory allocation directive including a name for the allocated memory, an address for the allocated memory, a size of the allocated memory, and a specification of the type of data to be stored in the allocated memory; and a memory identification directive that identifies memory whose contents are to be moved among host computers and accelerators, the memory identification directive including a name of the identified memory, an address of the identified memory, a size of the identified memory, and a specification of the type of data to be stored in the identified memory.

11. The hybrid computing environment of claim 7 wherein the directives comprise memory transfer directives, including:

a remote memory transfer directive that transfers the contents of local memory to remote memory, the remote memory transfer directive including a name of a segment of local memory whose contents are to be transferred, a name of a segment of remote memory to which the contents are to be transferred, and a hint regarding a data communications mode for the transfer; and a local memory transfer directive that transfers the contents of remote memory to local memory, the local memory transfer directive including a name of a segment of remote memory whose contents are to be transferred, a name of a segment of local memory to which the contents are to be transferred, and a hint regarding a data communications mode for the transfer.

12. The hybrid computing environment of claim 7 wherein the directives comprise memory assignment directives and use directives, the memory assignment directives including:

an assignment directive that assigns a value to a segment of memory, the assignment directive including a name of the segment of memory and a value to assign to the segment;

an assignment start directive that identifies the starting point of the computer program that carries out the assignment of the value to the segment;

an assignment end directive that identifies the end of the computer program that carries out the assignment of the value to the segment;

the use directives including:

a use start directive that identifies the start of the computer program that uses the segment; and a use end directive that identifies the end of the computer program that uses the segment.

13. A computer program product for software development for a hybrid computing environment, the hybrid computing environment comprising a host computer having a host processor comprising a host computer architecture, an accelerator having an accelerator processor comprising an accelerator architecture, the accelerator architecture optimized, with respect to the host computer architecture, for speed of execution of a particular class of computing functions, the accelerator architecture comprising a different architecture than the host computer architecture such that computer program instructions compiled for native execution by the accelerator cannot, without a recompile, be executed by the host processor and computer program instructions compiled for execution on the host processor cannot, without a recompile, be executed by the accelerator processor, the host computer and the accelerator adapted to one another for data communications by two or more data communications fabrics of at least two different fabric types, the computer program product disposed in a computer readable, recordable medium that is not a signal medium, the computer program product comprising computer program instructions that when executed by a computer cause the computer to carry out the steps of:

receiving from a programmer, a computer program for execution in the hybrid computing environment, the computer program including, along with computer program instructions, directives for generation of computer program code that moves contents of memory, across at least one of the data communications fabrics and between a host computer and an accelerator in the hybrid computing environment;

generating, by a code generator application, source code in accordance with the directives;

analyzing, by the code generator application, operation of the generated code for data movement and utilization of moved data by comparing operational metrics gathered during execution of the source code to historical data communication and memory utilization metrics to identify portions of the source code to alter during regeneration; and regenerating, by the code generator application, the identified portions of the source code in accordance with the directives and further in accordance with results of the analysis to improve results of execution of the source code in dependence upon the historical data communications and the memory utilization metrics.

14. The computer program product of claim 13 further comprising computer program instructions that when executed by the computer cause the computer to carry out the steps of:

providing the results of the analysis to the programmer.

15. The computer program product of claim 13 wherein generating source code in accordance with the directives further comprises generating the source code in dependence upon the types of data communications fabric that adapt the host computers and the accelerators.

16. The computer program product of claim 13 wherein the directives comprise memory management directives, including:

a memory allocation directive that allocates memory whose contents are to be moved among host computers and accelerators, the memory allocation directive including a name for the allocated memory, an address for the allocated memory, a size of the allocated memory, and a specification of the type of data to be stored in the allocated memory; and a memory identification directive that identifies memory whose contents are to be moved among host computers and accelerators, the memory identification directive including a name of the identified memory, an address of the identified memory, a size of the identified memory, and a specification of the type of data to be stored in the identified memory.

17. The computer program product of claim 13 wherein the directives comprise memory transfer directives, including:

a remote memory transfer directive that transfers the contents of local memory to remote memory, the remote memory transfer directive including a name of a segment of local memory whose contents are to be transferred, a name of a segment of remote memory to which the contents are to be transferred, and a hint regarding a data communications mode for the transfer; and a local memory transfer directive that transfers the contents of remote memory to local memory, the local memory transfer directive including a name of a segment of remote memory whose contents are to be transferred, a name of a segment of local memory to which the contents are to be transferred, and a hint regarding a data communications mode for the transfer.

18. The computer program product of claim 13 wherein the directives comprise memory assignment directives and use directives, the memory assignment directives including:

an assignment directive that assigns a value to a segment of memory, the assignment directive including a name of the segment of memory and a value to assign to the segment;

an assignment start directive that identifies the starting point of the computer program that carries out the assignment of the value to the segment;

an assignment end directive that identifies the end of the computer program that carries out the assignment of the value to the segment;

the use directives including:

a use start directive that identifies the start of the computer program that uses the segment; and a use end directive that identifies the end of the computer program that uses the segment.

\* \* \* \* \*